United States Patent [19]

Debeaux

[11] 4,118,980
[45] Oct. 10, 1978

[54] FLOWMETERS-VOLUMETERS

[75] Inventor: Alain Debeaux, Chatenay, France

[73] Assignee: Souriau et Cie, Boulogne-Billancourt, France

[21] Appl. No.: 820,745

[22] Filed: Aug. 1, 1977

[51] Int. Cl.² .............................................. G01F 3/08
[52] U.S. Cl. .............................................. 73/194 C
[58] Field of Search ............... 73/194 R, 194 E, 253, 73/255, 229, 194 C

[56] References Cited

U.S. PATENT DOCUMENTS

| 818,566 | 4/1906 | Scotti | 73/255 |
| 2,776,568 | 1/1957 | Ward et al. | 73/255 |

FOREIGN PATENT DOCUMENTS

| 4,420,898 | 2/1966 | Japan | 73/194 |
| 1,209,547 | 10/1970 | United Kingdom | 73/194 |
| 352,925 | 7/1931 | United Kingdom | 73/255 |

Primary Examiner—Herbert Goldstein
Attorney, Agent, or Firm—Larson, Taylor and Hinds

[57] ABSTRACT

A flowmeter-volumeter of the type which counts the revolutions of a mobile body in a revolution channel into which open a fluid inlet passage and a fluid exhaust passage. The device includes a first flange grooved with a revolution groove which is a first portion of the channel and grooved with one of both said passages, and a second flange grooved with a revolution groove which is a second portion of the channel and grooved with the other one one of the passages. Both flanges are connected by fastening means arranged for allowing a rotation displacement relative to each other, in order to be able to adjust the distance between the openings through which both passages open into the channel. The device is used to measure flow of a fluid.

7 Claims, 3 Drawing Figures

FLOWMETERS-VOLUMETERS

The present invention refers to the general field of flowmeters - volumeters and, more particularly, to those of the type counting the number of revolutions of a mobile body into a revolution channel to which open a fluid inlet passage and a fluid exhaust passage. The device includes a first flange having a revolution groove which is the first part of the channel and which has the first one of the above-mentioned passages, and a second flange having a revolution groove which is the second part of the channel and which has the second one of the above-mentioned passages.

Flowmeters of this type where both flanges are made mutually and definitely integral during assembly of the device, with no possible adjustment of their mutual angular position, are already known.

Now, with flowmeters of the above-mentioned type, the adequate mutual positioning of the openings of inlet and exhaust passages is particularly important for a good working of the apparatus.

As a matter of fact, should said openings be located in front of each other, a part of the fluid would pass directly from the inlet passage to the exhaust passage without circulating in the closed channel. On the other hand, should the openings be too far from each other, this would lead to the occurence between them of a "dead" gap where no fluid would virtually circulate, and where the ball would be "trapped" with no possibility of escape. In both cases, the apparatus would not work satisfactorily.

However, in case of an adequate mutual positioning of the openings of the inlet and exhaust passages, when the ball is located in the portion of the channel included between both openings, the vein of fluid passing through the exhaust passage pushes the ball back downstream in the said channel, the said ball being then sucked by the vein of fluid entering the channel via the inlet passage. The ball can then circulate in the annular channel continuously and smoothly.

Going further in details, it has been determined that there is a determined mutual location of both openings corresponding to a maximum sensitivity of the instrument, this location being liable to slight deviations from one to another apparatus, due to the machining tolerances for the openings of passages and for the diameter of the ball.

The purpose of the invention is thus to provide an improved flowmeter for allowing, either at the final stage of manufacturing or in use, should the instrument get out of adjustment, a very highly accurate mutual positioning of the openings of inlet and outlet passages for an optimum setting of the instrument for the lowest flow values.

For this purpose, the flowmeter-volumeter according to the invention is characterized by the fact that both flanges are connected together by fastening means designed for allowing them a rotation displacement relative to each other, so as to make possible the setting of the gap between the openings through which the inlet and outlet passages open into the channel.

Moreover, one can take advantage of any of the following additional arrangements or of any technically implementable combination of said arrangements:
the revolution channel is annular
the mobile body is a ball
the gap between the closest edges of both openings of inlet and exhaust passages is about one half-diameter of the ball
the means provided for adjusting the mutual angular position of both flanges include, preferrably, a hole co-axial with the annular channel and a bolt-locking ring-nut arrangement cooperating with said hole
in another type of implementation, the means provided for setting the mutual angular position of both flanges can have at least a slotted hole having the shape of an hollow bean into one of both flanges, and a rod passing through this hole, and can be made integral with both flanges.
the two-flange arrangement is clamped between stiffening metal plates.

The invention will be better understood by way of the following description of a type of implementation given as an example only, but not restrictive, with reference to the appended drawing where:

Figure 1:
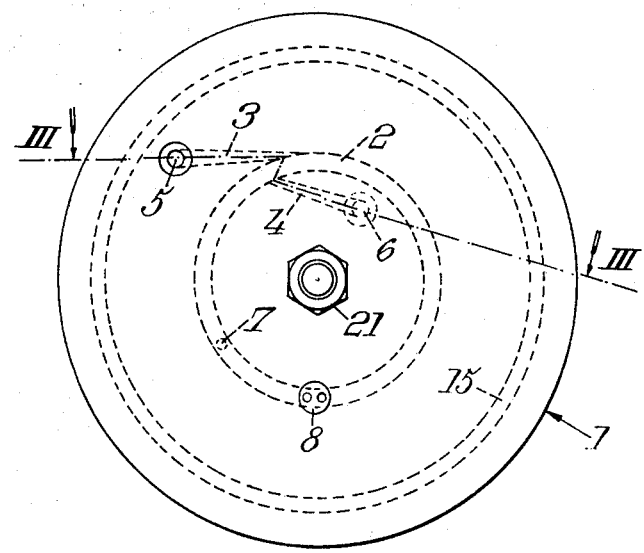
FIG. 1 is a plan view of a flowmeter according to the invention

With reference with FIG. 1, the flowmeter I essentially consists of an annular channel 2 into which open a fluid inlet passage 3 and a fluid exhaust passage 4, these passages being respectively connected by nozzles 5 and 6 to external hydraulic circuits.

A ball 7 is located in the annular channel 2 and rotatably driven by the circulating fluid. Through optical means consisting of a light source (not shown in the drawing) and a photo-sensor 8, it becomes possible to detect every passing through of the ball, the photo-sensor 8 being connected to electrical counting circuits which deliver an electrical signal proportional to the fluid flow or to the volume of the fluid flow for a selected time period.

Figure 2:
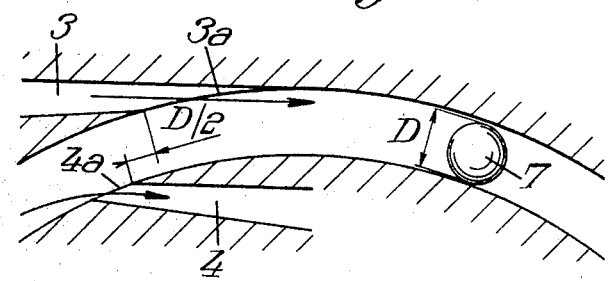
FIG. 2 is a magnified partial view of FIG. 1

As it is best seen in FIG. 2, the cross-section of the annular channel 2 is constant, but the cross-section of passages 3 and 4 decreases at the vicinity of the channel. Thus, openings for connecting these passages with the channel, resp 3a and 4a, are smaller than the diameter of the ball 7 in order to prevent the ball from escaping from channel 2 via passages 3 and 4.

Moreover, it is advantageous that ball 7 be made of a material having essentially the same specific gravity as the fluid the flow of which is to be measured.

As an example, with petrol or fluid with a specific gravity of approximately 0.75, the ball can be made of superpolyamide (Nylon) of a specific gravity of approximatively 1.12.

The passage 3 opens tangentially into channel 2, the opening of passage 4 being located upstream (in the direction of the ball displacement) and close to the opening of passage 3, both openings being located in opposite sides of channel 2.

It has been found that the nearest edges of the openings which connect the passages 3 and 4 with the annular channel 2 should be kept apart by a distance of approximately D/2, D being the diameter of the ball 7 (see FIG. 2).

Figure 3:
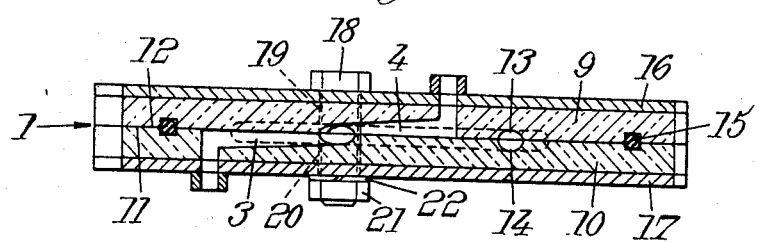
FIG. 3 is a sectional view along the line III—III of the device illustrated in FIG. 1.

As it is best seen in FIG. 3, the flowmeter 1 is made of two flanges 9 and 10, joined side by side at their large flat surfaces, respectively 11 and 12. These flanges are illustrated as having a disc shape, but any other shape can be also convenient.

Two annular grooves 13 and 14 are made respectively in the surfaces 11 and 12 of flanges 9 and 10. It is preferred to obtain these grooves directly through moulding during the manufacturing process of flanges 9 and 10 in order to give to the grooves a constant and uniform profile.

The inlet passage 3 and the exhaust passage 4 are made respectively in surfaces 11 and 12, either during the moulding process of flanges 9 and 10 or later on, for example by milling.

Morever, both surfaces 11 and 12 are grooved respectively with two other opposite annular grooves having a smaller diameter than the annular channel, and forming together a hollow ring in which an annular seal is located, for example an annular insulating seal 15.

Both surfaces 11 and 12 are also grooved with two other annular grooves (not illustrated on the Figures) having a smaller diameter than the annular channel, forming together a second hollow ring in which a second insulating seal is located.

It is also possible to replace second seal mentioned above by insulating seals fitted between the nut 21 and the plate 17 and between the head of the bolt 18 and the plate 16.

The flanges 9 and 10 being relatively thin, and thus liable to suffer from slight deformations, the whole flanges 9, 10 are clamped between two rigid discs, for example metal discs, 16 and 17. The whole arrangement is fastened by means of a bolt 18 passing through axial holes 19 and 20 bored respectively into the flanges 9 and 10 and a nut 21 locked by a ring 22. Naturally, the metal discs 16 and 17 have the necessary bores in front of nozzles 5 and 6 and holes 19 and 20.

The flowmeter can be adjusted as follows.

The previously described assembly process is carried out by setting two opposite markers drawn on the edges of flanges 9 and 10 for adjusting approximately the openings of passages 3 and 4 into the required position, i.e. essentially at a ball half-diameter from each other, the nut 21 being unlocked.

Then, the flowmeter is operated, and the operator rotates manually both flanges, one with respect to the other, for adjusting the instrument sensitivity for lowest flow value. This displacement is of about a few tenths of a millimeter.

Once this adjustment carried out, the nut 21 is locked and the flowmeter is calibrated.

It will be apparent that the invention is not limited whatsoever to the foregoing modes of application and implementation.

In particular, other means can be used for adjusting the mutual angular position of the flanges. For example, one of the flanges can be provided with a rod parallel to the axis of the annular channel but not coaxial to said axis. A rod passes through a bean-shaped slotted hole bored in the other flange, said rod being interlockable with both flanges.

In this case, for easier positioning of the flanges in an adequate relative positioning, one of the flanges can be provided with a protruding circular table and the other flange can be provided with a circular cavity having a shape complementary to the shape of the table. The various grooves described above and necessary to flowmeter operation are grooved in the table and cavity, respectively.

It is also possible that cooperating surfaces of the flanges have a not-flat surface, but are of revolution shapes about the axis of the annular channel, for example of conical, truncated or cylindrical shape, the different grooves and cavities being made into these revolution surfaces.

I claim:

1. A flowmeter-volumeter of the type which counts the revolutions of a mobile ball in an annular channel into which a fluid inlet passage and a fluid exhaust passage open, comprising a first flange grooved with a revolution groove which comprises a first portion of said annular channel and grooved with one of said passages, a second flange grooved with a revolution groove which comprises a second portion of said annular channel and grooved with the other one of said passages, the opening of the exhaust passage being positioned above, in the direction of the ball displacement, the opening of the inlet passage and the gap between the closest edges of said openings being less than one diameter of the ball, and fastening means connecting the flanges together and constructed and arranged for allowing a rotation displacement relative to each other, in order to be able to adjust with precision the distance between the openings through which both passages open into the channel.

2. A flowmeter-volumeter according to claim 1, wherein the gap between the closest edges of the openings of inlet and exhaust passages is of about one half-diameter of the ball.

3. A flowmeter-volumeter according to claim 2, further comprising an annular insulating seal located into two opposite grooves provided between both flanges.

4. A flowmeter-volumeter according to claim 2, wherein said fastening means comprises a central hole and a bolt-locking ring-nut cooperating with said hole.

5. A flowmeter-volumeter according to claim 1, wherein said fastening means comprises a bean-shaped slotted hole grooved into one of the flanges, and a rod passing through this hole and which can be made integral with both flanges.

6. A flowmeter-volumeter according to claim 1, wherein the first and second flanges are clamped between two stiffening metal plates.

7. A flowmeter-volumeter according to claim 1, wherein the fluid inlet passage is tangent to the annular channel.

* * * * *